United States Patent
Brune et al.

(10) Patent No.: US 8,200,877 B2
(45) Date of Patent: Jun. 12, 2012

(54) DEVICE FOR PROCESSING A STREAM OF DATA WORDS

(75) Inventors: Thomas Brune, Hannover (DE);
Michael Walden, Hannover (DE);
Oliver Kamphenkel, Lehrte (DE);
Herbert Schuetze, Celle (DE)

(73) Assignee: Thomson Licensing, Boulogne-Billancourt (FR)

( * ) Notice: Subject to any disclaimer, the term of this patent is extended or adjusted under 35 U.S.C. 154(b) by 76 days.

(21) Appl. No.: 12/310,749

(22) PCT Filed: Sep. 4, 2007

(86) PCT No.: PCT/EP2007/059245
§ 371 (c)(1),
(2), (4) Date: Mar. 5, 2009

(87) PCT Pub. No.: WO2008/028910
PCT Pub. Date: Mar. 13, 2008

(65) Prior Publication Data
US 2010/0005205 A1    Jan. 7, 2010

(30) Foreign Application Priority Data
Sep. 6, 2006 (EP) ............................... 06120168

(51) Int. Cl.
*G06F 13/14* (2006.01)
*G06F 13/38* (2006.01)
(52) U.S. Cl. ...................... 710/305; 710/240

(58) Field of Classification Search .......... 710/305, 710/313; 370/351, 389, 392, 465, 470–474, 370/476
See application file for complete search history.

(56) References Cited

U.S. PATENT DOCUMENTS

| | | | |
|---|---|---|---|
| 6,243,781 B1 | 6/2001 | Gandhi et al. | |
| 7,424,565 B2* | 9/2008 | Sandven et al. | 710/310 |
| 7,487,273 B2* | 2/2009 | Kobayashi | 710/62 |
| 7,535,913 B2* | 5/2009 | Minami et al. | 370/401 |
| 7,620,057 B1* | 11/2009 | Aloni et al. | 370/395.7 |
| 7,631,118 B2* | 12/2009 | Renaud et al. | 710/52 |
| 7,636,835 B1* | 12/2009 | Ramey et al. | 712/11 |
| 7,668,165 B2* | 2/2010 | Hoskote et al. | 370/392 |
| 2008/0072113 A1* | 3/2008 | Tsang et al. | 714/748 |

OTHER PUBLICATIONS

PCI Express Base Specification Revision 1.0a, Apr. 15, 2003, pp. 1, 20-21, 44-46.*
Search Report dated Nov. 2, 2007.

* cited by examiner

*Primary Examiner* — Paul R Myers
*Assistant Examiner* — Trisha Vu
(74) *Attorney, Agent, or Firm* — Tutunjian & Bitetto, P.C.

(57) ABSTRACT

State of the art processor systems, esp. in embedded systems, are not able to process data under real-time conditions especially with throughput rates near 10 Gbps. So, when using interfaces like PCI Express (PCIe) or Infiniband or 10 G-Ethernet for 10 Gbps data throughput, special data-paths have to process the high throughput rate data. But tasks like connection management or time uncritical control messaging are better manageable by a processor. According to the invention it is proposed a kind of multiplexer architecture that is needed to split between control and data-path access for a PCI Express based architecture.

8 Claims, 6 Drawing Sheets

DEVICE FOR PROCESSING A STREAM OF DATA WORDS

This application claims the benefit, under 35 U.S.C. §365 of International Application PCT/EP2007/059245, filed Sep. 4, 2007, which was published in accordance with PCT Article 21(2) on Mar. 13, 2008 in English and which claims the benefit of European patent application No. 06120168.7, filed Sep. 6, 2006.

The proposal concerns the field of high speed interfacing, in particular for the purpose of video production in film and broadcast studio environments.

BACKGROUND

State of the art processor systems, esp. in embedded systems, are not able resp. foreseen to process data under real-time conditions especially with throughput rates near 10 Gbps. So, when using interfaces like PCI Express (PCIe) or Infiniband or 10G-Ethernet under real-time conditions for 10 Gbps data throughput, special data-paths have to process the high throughput rate data. But tasks like connection management or time uncritical control messaging are better manageable by a processor.

A problem is that the data packets for the real time data transfer and the bus management and/or other control messages occur intermixed on the PCIe bus. When completions need to be generated for the real-time data transfer a problem may occur that the other messages will not led through the interface fast enough.

Invention

To solve the problem, the invention proposes a kind of multiplexer architecture to split between control and data-path accesses for high bandwidth interface architectures.

A packet oriented control scheme for accessing a high bandwidth interface core such as PCIe core, for connection management purpose is separated from a packet oriented data processing scheme by an intelligent multiplexer/FIFO control architecture. This multiplexer supports a priority scheme and e.g. PCIe aligned packet length while switching.

An advantage of the invention is that it significantly saves processor performance by distinguishing between data-path and control-path in high bandwidth interface based architectures.

The invention provides for a maximum data throughput.

DRAWINGS

Exemplary embodiments of the invention are illustrated in the drawing and are explained in more detail in the following description.

EXEMPLARY EMBODIMENTS

Figure 1:
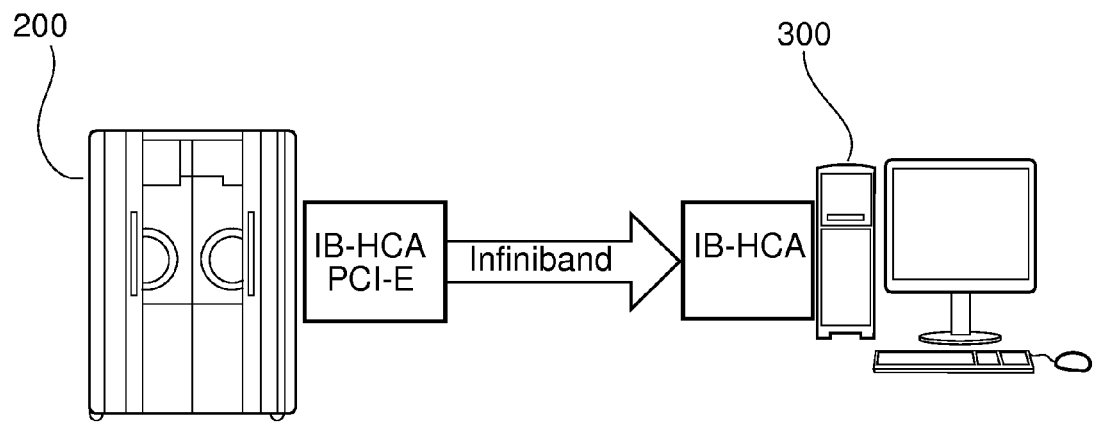
FIG. 1 shows the use of the Infiniband bus system for the transport of data from a film scanner to a storage server.

FIG. 1 shows a professional film scanner 200 connected to a professional storage server 300 via an Infiniband network. For the Infiniband network connection PCI Express based hardware solutions are already existing on the market. The use of PCI Express based HW is open to the future use of 10 Gbit Ethernet instead of Infiniband.

Figure 2:
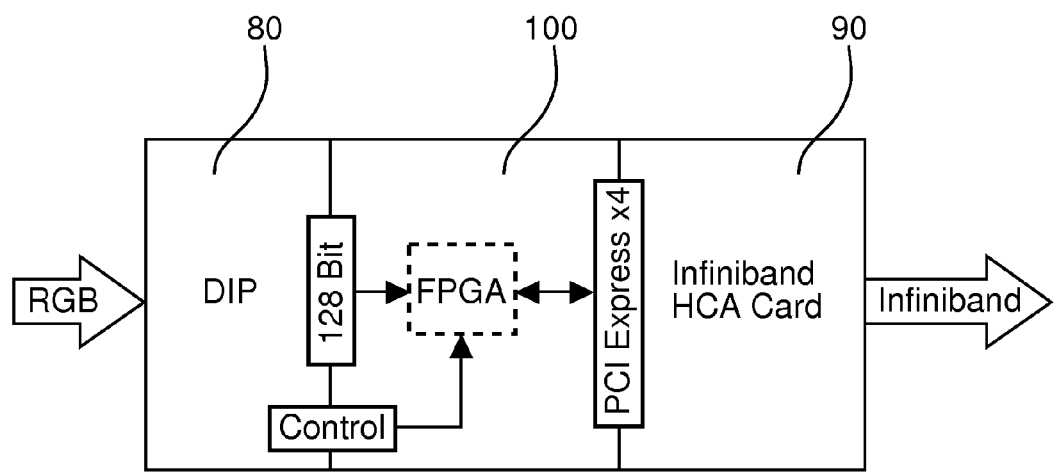
FIG. 2 shows a platform for implementing the invention.

FIG. 2 shows a Digital Image Processor 80 which is part of the film scanner. FPGA 100 is the interface between the film scanner 200 and the Infiniband HCA card 90.

Film scanner 200 is the data source and the storage server 300 is the data sink. The film scanner is a so-called 4 k film scanner that samples the Celluloid film in a resolution of 4096*3112 Pixels at a colour depth of 48 Bit. This corresponds to the standard resolution of digital cinematography. The film scanner operates at a rate of 7.5 pictures per second. This leads to a data rate of 4.6 Gbit/s.

Figure 3:
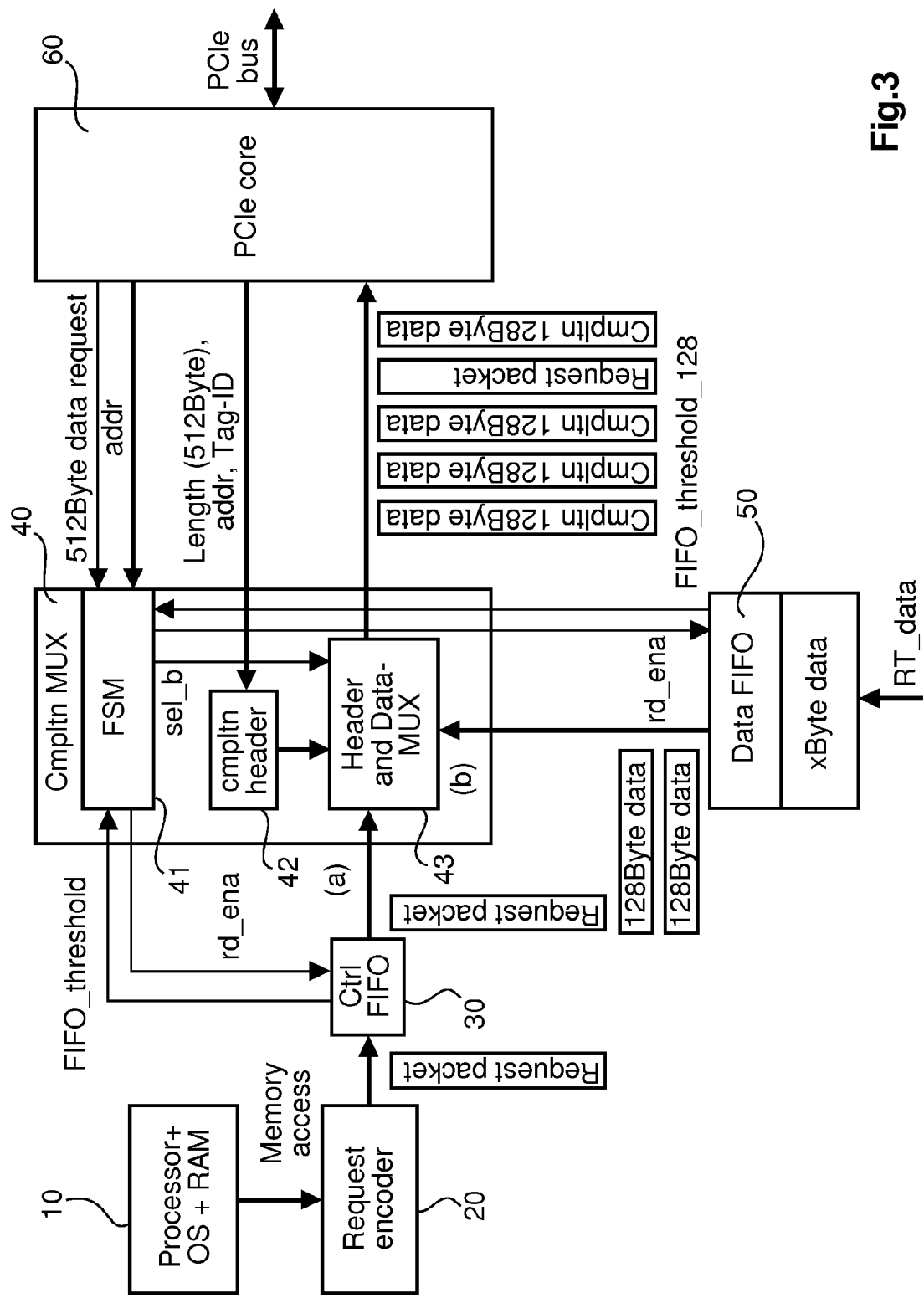
FIG. 3 shows the principal architecture of a data processing system with PCIe interface including a block diagram of the multiplexer according to the invention.

FIG. 3 shows a system comprising of a Processor+operating system (OS)+RAM 10 and a Request Encoder 20 and a Ctrl-FIFO 30 and a Completion-Multiplexer (Cmpltn-MUX) 40 and a Data-FIFO 50 and a PCI-Express core 60. PCI Express is a known bus standard for which a variety of hardware and software components are available on the market. This bus standard is abbreviated PCIe in the following. All components are transparent for the Processor 10, respectively the OS, regarding accessing the PCIe bus via memory accesses. The low data rate control path is denoted (a), a high data rate path is denoted (b) and a real-time data path is denoted (RT-data).

A memory access of the processor 10 respectively the OS is encoded into a Request-packet by the Request encoder 20 and stored in the Ctrl-FIFO 30. Here, it is the responsibility of the Cmpltn-MUX 40 to fetch the Request-packets out of the Ctrl-FIFO 30 and distribute them to the PCIe core 60, where they are decoded into PCIe flavor memory accesses. Header and data may be processed separately in the Cmpltn-MUX 40. At the same time it is possible that there are 512 Byte data requests on PCIe bus that are handed through with the desired address area by the PCIe core 60 to a finite state machine (FSM) unit 41 of the Cmpltn-MUX 40. These data requests are to be acknowledged by several 128 Byte completions out of the Data FIFO 50. Therefore a completion header is to be generated, containing at least information about the length, the address and a unique Tag-ID (to identify request and the according completions). There are several request/completion length ratios specified in PCIe specification. E.g. a 512 Byte request can be answered by 4 times 128 Byte completions. This example is shown in FIG. 3. The PCIe core 60 makes a 512 Byte data request by the multiplexer 40. In response, the multiplexer 40 fetches 4 pieces of 128 Byte blocks out of the data FIFO 50. A PCIe completion header is added to each 128 byte block. If needed i.e. optionally, a footer can be added as well, here. This new packet is transferred to the PCIe core in each case.

Kernel of this invention is the behavior of the Cmpltn-MUX 40, where

1. The FSM 41 is responsible for handling the FIFO thresholds of the Data FIFO and the Ctrl FIFO.
2. The FSM 41 has a processing priority on the FIFO threshold of the Ctrl FIFO respectively the FIFO threshold of the Data FIFO. The Rule is:
   If there is the FIFO threshold detected on the Ctrl-FIFO, wait for the last byte of a 128 Byte packet that may currently be transferred from the Data-FIFO 50. Then transfer the packet out of the Ctrl-FIFO 30 with priority.
3. The FSM 41 is also responsible for reading out the Ctrl- and Data-FIFOs via read enable signals rd_ena.
4. The FSM 41 is also responsible for reading data units out of the Data-FIFO 50, where the size is according a negotiated PCIe data completion length. For this, a data counter is implemented within the FSM 41.

5. The FSM 41 is further responsible for processing complete Request packets and 128 Byte data units before driving the Header and Data multiplexer 43 to switch between paths (a) and (b) via sel_b signal.
6. A Cmpltn header generator 42 is responsible for adding a PCIe conform completion header and footer structure to every 128 Byte data unit.

Figure 4:
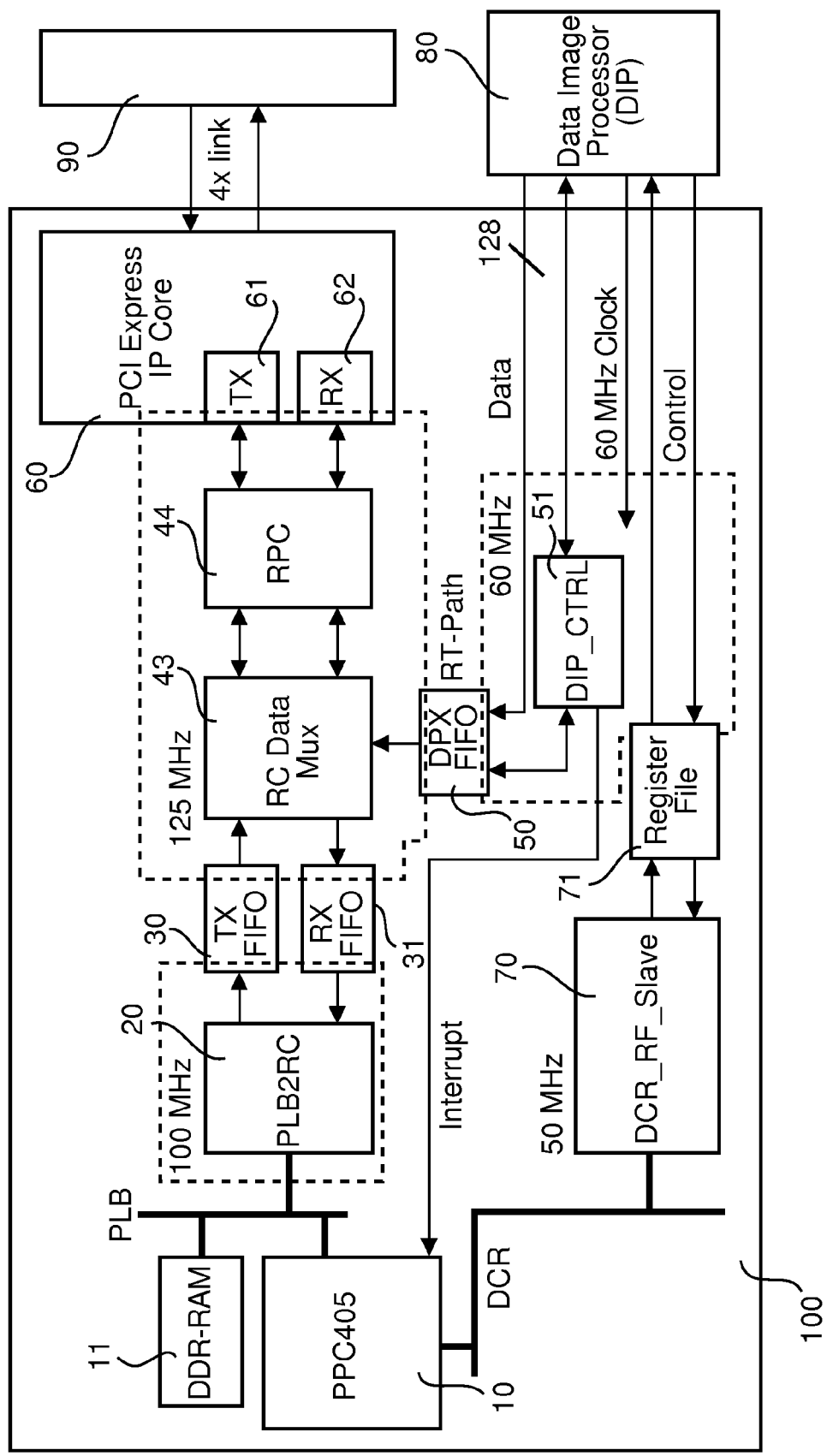
FIG. 4 shows a detailed architecture in block diagram form.

Another more detailed embodiment of the invention is shown in FIG. 4 depicting architecture of a hardware design based on the Xilinx Virtex-4 Architecture. With grey shading around some of the modules, it is indicated where the different clock domains are located in the hardware design. The whole architecture can be divided in two areas: The upper area between the PowerPC 10 and the PCI Express IP Core 60 is a PLB-to-PCI Express Bridge in which the real time data stream needs to be merged. The lower part of the architecture serves for attaching the Digital Image Processor 80 to the bridge and enables the communication between PowerPC 10 and Data Image Processor 80 via a Register File 71 and an interrupt. PLB is an IBM developed BUS protocol named Processor Local Bus which was designed to enable fast and high performance bus transfers between a high speed memory and the PowerPC.

In the Virtex-4 Architecture a PowerPC405 from IBM is included as a hardware block. It is connected with the FPGA-Fabric via the PLB Bus. Also connected to the PLB is a DDR-RAM block 11 that serves as a working memory to the Linux operating system.

A module PLB2RC 20 is a PLB master/slave module that transforms the read/write commands from and to the PLB with the help of a transmission and a reception FIFO memory 30, 31. For this purpose a simple proprietary protocol is used so that no additional control lines need to be designed aside to the FIFO memories. In addition, the FIFO memories 30, 31 further guarantee the correct data transfer between the two different clock domains. There are two FIFO memories provided in order to allow for a full duplex data flow between the different modules.

The main task from the Root Complex Data Multiplexer 43 is the insertion of the real time data from the Digital Image Processor 80 into the data stream that flows through the bridge and was initiated by the PLB or the PCI Express IP Core.

The PCI Express IP Core 60 is configured as a root port comprising 4 lanes and a virtual channel. It has two independent data ports, one for the transmission and one for the reception direction. For driving the core a Root Port Controller 44 is needed, that has the task to decode the transaction layer packets TLP on one hand and to interact with the Root Complex Data Multiplexer 43 on the other hand.

Digital Image Processor 80 includes a frame buffer that intermediately stores the scanned pictures in a Digital Moving-Picture Exchange (DPX) file format. Access to the data in the buffer is made over a data bus having a width of 128 Bits that is controlled with a simple handshaking bus protocol. For routing the data from the frame buffer to the Root Complex Data Multiplexer 43 two modules are needed. One is a DPX FIFO memory 50 serving as a buffer and for data synchronizing between the two clock domains and the other is a DIP controller 51 that controls the data flow from frame buffer to the FIFO memory 50. Data Image Processor 80 further comprises a data path and a control path for a Register File 71. Said Register File 71 contains for example information about the picture size and resolution and is therefore connected to the PowerPC DCR bus via a DCR_RF_Slave unit 70. The DCR bus is also an IBM development.

Figure 5:
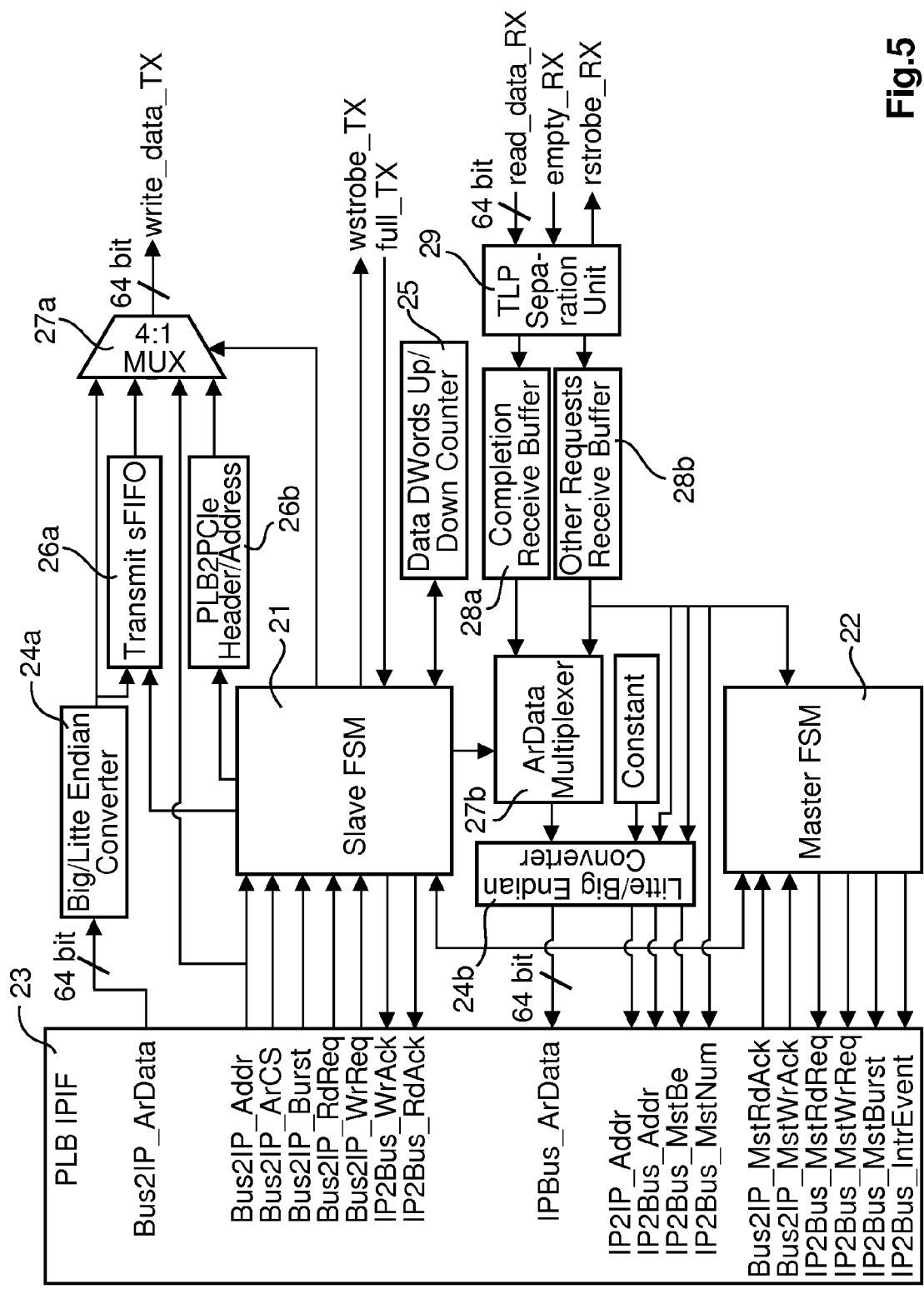
FIG. 5 shows a special designed memory interface block inside the architecture to interface to a PLB bus.

In the following, some of the modules depicted in FIG. 4 will be explained in more detail. FIG. 5 shows the block diagram of the PLB2RC module 20. This module needs to have the PLB master functionality in addition to the slave functionality because the Infiniband Card 90 is capable of making entries in the DDR-RAM 11 by itself. For this purpose there are two finite state machines foreseen in the design. One is a Slave Finite State Machine 21 and the other is a Master Finite State Machine 22. Both communicate with the PLB Bus Interface 23 by means of request/acknowledge interactions. An Endian codec is needed. The PowerPC 10 processes data in Big Endian format whereas the whole interface design and the PCIe Core 60 uses the Little Endian format. The conversion of the Endian format is done in an Big/Little Endian Converter 24a.

Slave Modus

There are three different types of PCIe access types that need to be separated. For doing this, the PLB slave modus uses three different memory areas which are known to the PLB Bus Interface 23. If there is a request from the PLB bus, the interface 23 assigns to the request one of the three memory areas and indicates which type it is by means of a 3-Bit vector Bus2IP_ArCS. The Slave FSM 21 evaluates the signal and makes the corresponding entry of this type in the PLB2PCIe Header.

For signaling a write request with a single data word, the PLB Bus Interface 23 generates a Bus2IP_WrReq signal by setting it to 1. The Slave FSM 21 also makes the entry for the type and data length in the header as well as which memory area is concerned.

The PLB specification defines so called burst-transfers, having a maximum length of a 128 Bytes. During the request phase however, the length is unknown. This leads to an implementation of a counter Data DWords Up/Down Counter 24 that counts the received data words when they are written into the Transmit sFIFO Buffer 26a. Takeover of the data words happens with the setting of the IP2Bus_WrAck signal to the "1" value. Thereafter, the counter value will be entered into the header for the burst-transfer.

A 4:1 Multiplexer 27 serves for transferring the packet to the RC Data Mux 43. The Multiplexer first switches the PLB2PCIe Header onto the bus followed by the address Bus2IP_Addr and successively the content of the Transmit sFIFO 26a.

For read access Bus2IP_RdReq, the request is sent to the PCIe Root Port controller 44 that responds with the PCIe completion message. The data packet will be buffered in the Completion Receive Buffer 28a. Slave FSM 21 switches the data with the help of the ArData Multiplexer 27b to the output IP2Bus_ArData and ends the transaction with a signal on IP2Bus_RdAck. There is also a TLP Separation Unit 29 provided in the PLB2RC module 20. The need to have the module 29 will be explained hereinafter, when the master module is described.

For reading of data in the burst mode, there is a problem in connection with the length of the data. The length information is not available in the PLB Bus Interface 23. In a PLB burst mode, data words can not be read singly, nor can they be requested at the PCIe Core in single data words. For this reason the PLB burst length needs to be read by the PowerPC Core 10. After that, the data will be forwarded to the PLB Bus Interface 23. This operation continues until the IP Bus Interface 23 drops the Bus2IP_RdReq line to the low potential again. In the case, when not all the 128 Bytes had been requested, the remaining data will be deleted in the Completion Receive Buffer 28a.

Master Mode

For implementing a master mode, a second Finite State Machine 22 is needed. It is under the discretion of the Master FSM 22 to control the request and interrupt. Just if the other request buffer 28b receives a packet, the correspondingly needed addresses IP2Bus_Addr and IP2IP_Addr, the Byte Enable signal IP2Bus_MstBE and the transfer size signal IP2Bus_MstNum are to be written. With the setting of the IP2Bus_MstRd/WrReq line a bus transfer request is sent to the bus interface 23. Immediately, after the PLB-Arbiter provides access to the bus for a master writing access, the said data will be read from the local address IP2IP_Addr and written to the address IP2Bus_Addr. On the slave side, a read request will be started under the same conditions, as in the slave mode, with the only difference that the IP2Bus_ArData output is now switched to the other request buffer 28b by means of the ArData Multiplexer 27b. The end of the transaction will be signaled by the Master FSM 22 by setting the Bus2IP_MstRdAck line. The master read request works in the same way. The PLB Bus Interface 23 reads the data from the address IP2Bus_Addr and writes them to the local address IP2IP_Addr. Apart from the type coding, the master read access is in accordance with the slave mode. The request has been initiated by the PCIe Root Port in this case so that the completion type needs to be entered as well.

It is the task of the TLP Separation Unit 29 to filter all the received completion packets from RX FIFO Memory 31 and writing them into the Completion Receive Buffer 28a. All the remaining packet types (Memory Read/Write, Messages) will be memorized in the other Request Receive Buffer 28b. This type of packet sorting had been implemented on accord of avoiding a deadlock.

Figure 6:
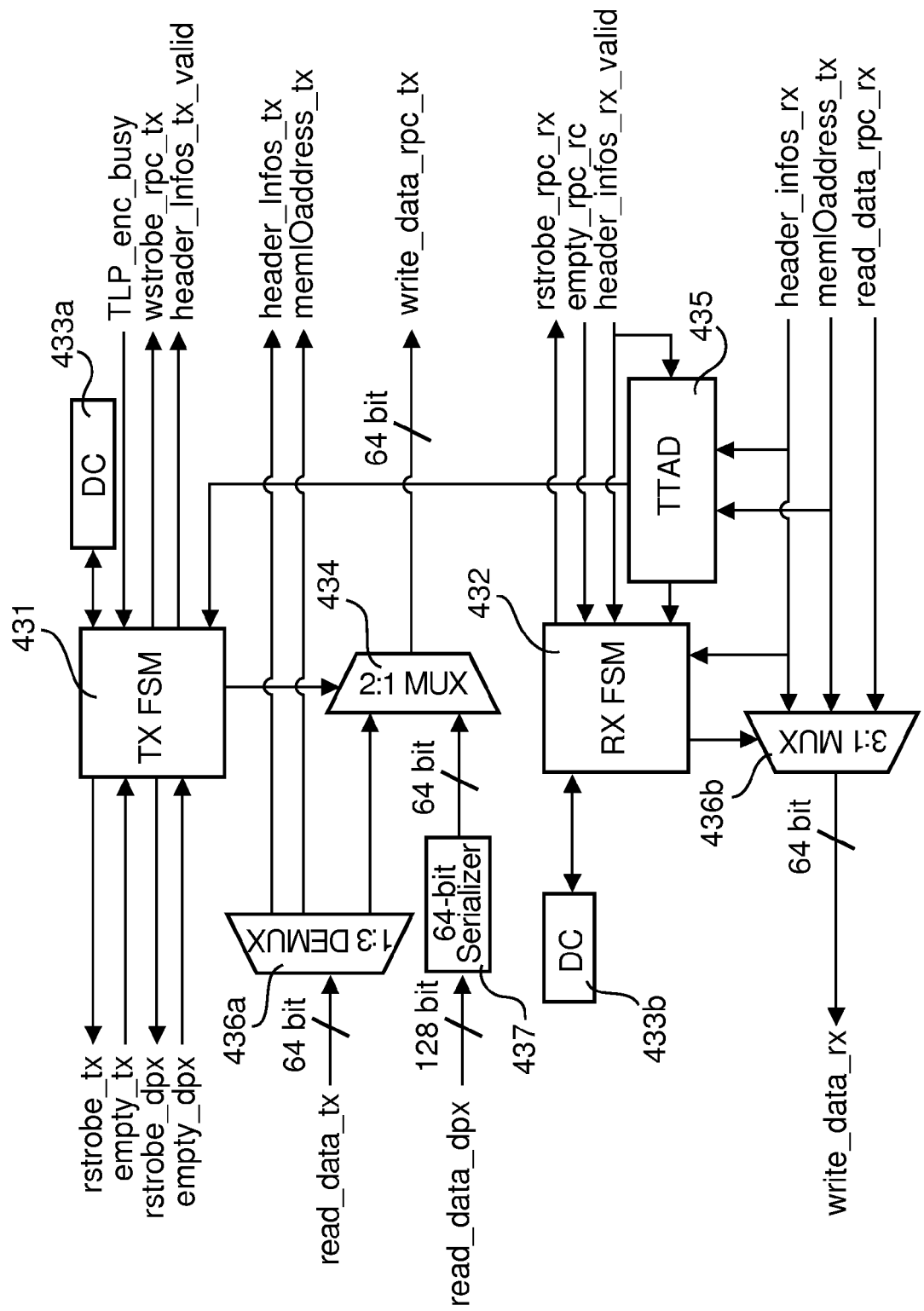
FIG. 6 shows a detailed block diagram of the multiplexer/demultiplexer according to the invention.

FIG. 6 shows a block diagram of the RC Data Mutiplexer 43. The block includes two logics, one for the transmit path and one for the receive path. In the transmit path all the received packets will be decoded and the header as well as the address is handed out to the Root Port Controller 44 in parallel. Corresponding transfer lines (header_infos_tx) and (memIOaddress_tx) and (header_infos_tx_valid) are identified in the drawing. The line for the header valid signal will be set to the active state after all the data words in the Transmit FIFO 30 have been transferred into a further FIFO RPC FIFO TX 445a. A signal TLP_enc_busy=0 indicates, that the Root Port Controller 44 is in Idle state and is waiting for receiving new data. The state is changed if no data will be received after a while. Then the Transmit FSM 431 changes into a wait state where it does not transfer any data to the Root Port Controller 44.

An analogue RX path exists with the difference that the data flow is in the direction of the PLB Bus Interface 23. On setting the header_infos_rx_valid signal the RX FSM module 432 transfers a header, the address and the data one after the other to the RX FIFO Buffer 31. The two data counters 433a and 433b guarantee that the right amount of data words will be transferred, as it is theoretically possible that the FIFO memories contain a plurality of packets and therefore it can not be relied on the empty signals for determining the packet end points. Main purpose of the Root Complex Data Multiplexer 43 is to annex the DPX FIFO memory 50 through which the film scanner data stream is flowing. The decision, whether the data from the PLB2RC module 20 are led through the TX path or from the scanner, takes the Transaction Type and Address Decoder 435. This TTAD block 435 checks the request handed out by the Root Port Controller 44 if the following conditions are met:

1. header_infos_rx: the packet must be from the type Memory Read.
2. memIOaddress_rx: the read address should be from a defined range only.

Figure 7:
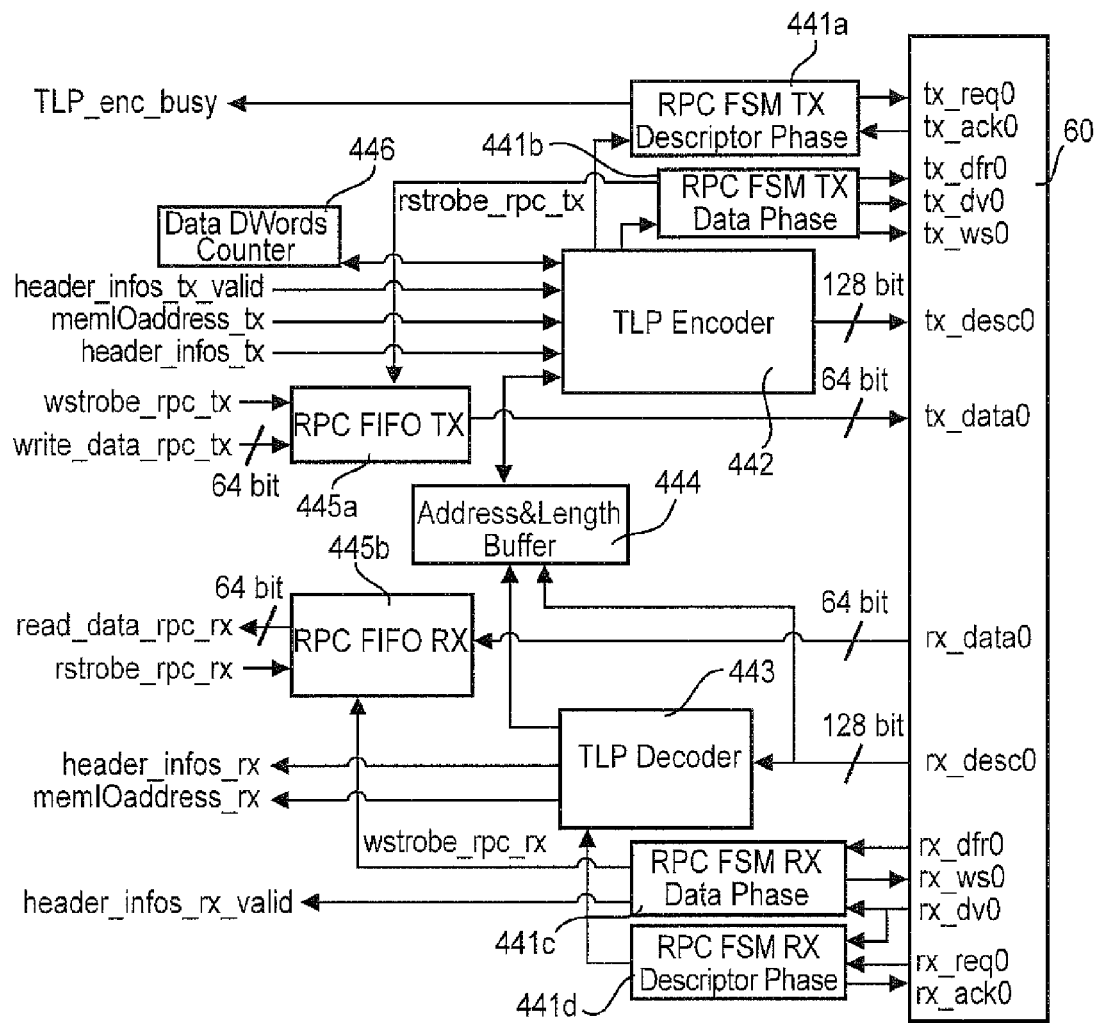
FIG. 7 shows a detailed block diagram of a root port controller module used for driving a PCI Express IP core, and FIG. 8 a timing diagram for the signals on the PCIe bus.
Figure 8:
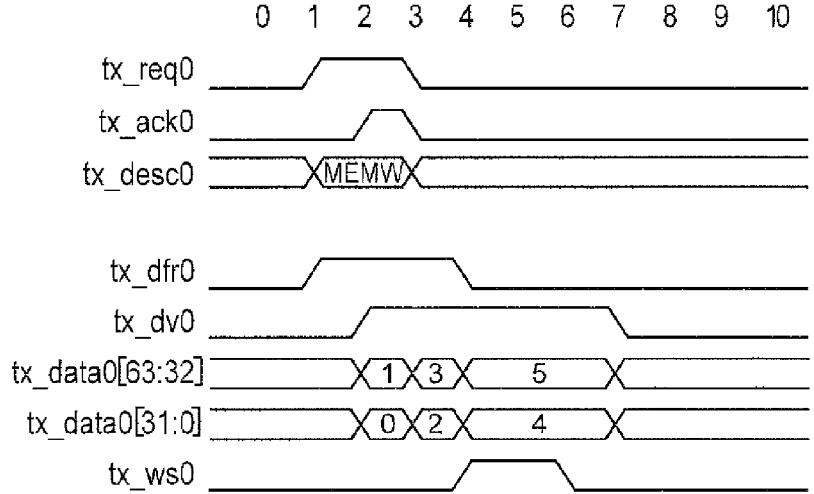

A problem for taking the decision is the address range, in which the Infiniband card expects the picture data. Normally, this address range is allocated by the software inside the DDR-RAM 11. However, the picture data from the scanner do not go to the DDR-RAM 11. For this, the address range is assigned to the DPX FIFO Memory 50 as the whole and the Root Complex Data Multiplexer 43 needs to know the borders of the memory range. The borders of the address range are programmed in registers with the help of an application program. For the communication with the PCIe Core 60 a Root Port Controller 44 is needed, which block diagram is shown in the FIG. 7. PCIe Core 60 comprises two different ports, one for the transmit path TX and one for the receive path RX. Both of the ports will be driven with a descriptor (128-Bit TLP Header) and a data phase. For controlling the single phases, four Finite State Machines 441a, 441b, 441c and 441d are provided. The timing diagram is shown in FIG. 8 that depicts the process of a data transfer inclusive some wait cycles.

For transferring a transaction layer packet TLP the header signal needs to be applied to the core 60 by means of the tx_req0 signal. The core acknowledges the takeover of the data by means of a tx_ack0 signal. The header data comes over the line tx_desc0. For transferring the data words to the PCIe Core 60, the tx_dfr0 line and the tx_req0 line are set to the active level in the same clock cycle. There is a data valid signal tx_dv0 that indicates when the data is valid. A tx_dfr0 signal needs to be set back to the inactive level for indicating the end of the data transmission. In the case, that the PCI Express Core 60 is busy, it will signal the busy state by a signal on the line tx_ws0. This will pause the data transmission for a while. The timing diagram as shown in FIG. 8 also explains the signal flow in the opposite direction.

The TLP Encoder 442 is responsible for coding the TLP headers and a TLP Decoder 443 has the task of decoding the TLP headers. Both blocks exchange the necessary information with the help of the header_infos and memIOaddress signals from the Root Complex Data Multiplexer 43. The RPC FIFO TX memory 445a contains all the data words that should be transferred. The writing port will be driven by the Root Complex Data Multiplexer 43 that set the header_infos_tx_valid signal to the value 1 after all the data words from a packet have been written into the FIFO Memory 445a. When said writing has been finished, the TLP_enc_busy signal is set and the correct amount of data words will be written into the Root Port Core 60 with the help of the Data DWord Counter 446.

According the PCI Express specification, it is allowed to respond to a read request of a defined size with a plurality of completion packets a single one of which only returns back part of the requested data. For example, a memory read request for 128-Bytes can be answered with two completion packets each of which contain 64 data Bytes. It is also allowed that both completion packets will not follow one after the other in the data stream; there might be some intermediate packets in between them. In this case it is a problem for the requester to assign the right completions to the correct memory range. For this purpose a tag ID is used that is taken from the Memory Read TLP request packet and is inserted into the completion header. Also, the header has two further fields which have the following meaning:

Lowaddress: This field needs to be set only in the first completion packet. The address is resulting from a combination of the five lowest order address Bits and two Bits derived from the Byte-Enable Value. For the remaining completion packets all the Bits will be set to 0 except for the MSB that is toggling between 1 and 0.

Bytecount: This value indicates how many remaining Bytes are needed for completing the read request. The separation in a plurality of completions is done by the TLP Encoder 442, that also calculates the Lowaddress and the Bytecount values. For calculating, it needs the address, the length and the Byte-Enable value, that are buffered in an address and length buffer 444. As a number of read requests are simultaneously waiting for a response, and all these can be differed by their tag ID, the tag ID is taken directly for addressing the address and length buffer 444.

DIP Controller module 51 rules the picture data flow from the Data Image Processor 80 to the DPX FIFO Memory 50. The DPX FIFO Memory 50 takes the data from a 128-Bit broad writing port. A second task from the DIP Controller 51 is the generation of an interrupt that indicates the PowerPC Core 10 the start of the transfer of the film scanner data. The interrupt service routine executed on the PowerPC Core 10 starts a program, that prepares the Infiniband communication.

Certain aspects commensurate in scope with the disclosed embodiments are set forth above. It should be understood that these aspects are presented merely to provide the reader with a brief summary of certain forms the invention might take and that these aspects are not intended to limit the scope of the invention. Indeed, the invention may encompass a variety of aspects that may not be set forth above.

The invention claimed is:

1. Device for processing a stream of data words received from a data source at one input, wherein the data words are buffered in a first FIFO memory, further comprising an interface for outputting the data words in completion packets of a defined format, and comprising a processor for generating request packets for controlling an external device via the interface, wherein the request packets are buffered in a second FIFO memory, wherein said completion packets and request packets are transferred to the interface via the same data lines, further comprising a multiplexer unit, that mixes completion packets and request packets for output via the interface in a manner according to a priority scheme, where a currently being transferred completion packet with a preset completion packet length is continued to be sent until the last byte of the currently being transferred completion packet is sent and a request packet ready to be sent is transferred with high priority over the bus, thereby interrupting the transfer of further completion packets ready to be sent for the time needed to send the request packet ready to be sent.

2. Device according to claim 1, wherein the first FIFO memory is adapted to provide a first packet indication signal to the multiplexer unit, in case the number of collected data words reaches a threshold corresponding to the preset completion packet length.

3. Device according to claim 1, wherein the second FIFO memory is adapted to provide a second packet indication signal to the multiplexer unit, in case the number of collected data words reaches a threshold corresponding to a preset request packet length.

4. Device according to claim 1, wherein the interface is a PCI Express interface and the multiplexer unit comprises a completion header generator for generating a PCI Express completion header for the completion packets to be sent to the interface.

5. Device according to claim 4, wherein the multiplexer unit is equipped with a PCI Express completion header generator and a completion packet and request packet multiplexer.

6. Device according to claim 4, wherein the multiplexer unit comprises a separation unit that separates requests for sending completion packets from request packet responses and directs the requests for sending completion packets to a finite state machine for building corresponding completion packets on one hand and the request packets responses to the processor on the other hand.

7. Device according to claim 6, wherein the separation unit includes two correspondingly adapted address and transfer type decoders.

8. Device according to claim 1, wherein the multiplexer unit is equipped with a finite state machine that is adapted to work according the rule that if the second indication signal is detected, the state machine waits for the indication that the last data word from a packet in the first FIFO memory has been processed in the multiplexer before it starts to transfer the request packet from the second FIFO memory.

* * * * *